(12) United States Patent
Tsujino

(10) Patent No.: US 11,818,016 B2
(45) Date of Patent: Nov. 14, 2023

(54) NETWORK DESIGN APPARATUS, NETWORK DESIGN METHOD AND PROGRAM

(71) Applicant: NIPPON TELEGRAPH AND TELEPHONE CORPORATION, Tokyo (JP)

(72) Inventor: Masayuki Tsujino, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 85 days.

(21) Appl. No.: 17/594,563

(22) PCT Filed: May 14, 2019

(86) PCT No.: PCT/JP2019/019181
§ 371 (c)(1),
(2) Date: Oct. 22, 2021

(87) PCT Pub. No.: WO2020/230274
PCT Pub. Date: Nov. 19, 2020

(65) Prior Publication Data
US 2022/0210025 A1 Jun. 30, 2022

(51) Int. Cl.
*H04L 41/04* (2022.01)
*H04L 41/0826* (2022.01)
*H04L 41/14* (2022.01)

(52) U.S. Cl.
CPC ........ *H04L 41/145* (2013.01); *H04L 41/0826* (2013.01)

(58) Field of Classification Search
CPC ............... H04L 41/145; H04L 41/0826; H04L 41/0896; H04L 43/0876; H04L 41/14
See application file for complete search history.

(56) References Cited

U.S. PATENT DOCUMENTS

2005/0069314 A1 3/2005 De Patre et al.
2013/0159045 A1 6/2013 Ettl et al.
(Continued)

OTHER PUBLICATIONS

Michael Pioro and Deepankar Medhi , Routing, Flow, Capacity Design in Communication and Computer Networks, 2004 (Year: 2004).*

(Continued)

*Primary Examiner* — John A Follansbee
*Assistant Examiner* — Fadi Haj Said
(74) *Attorney, Agent, or Firm* — IPUSA, PLLC

(57) ABSTRACT

A network design device executes the following steps: inputting a configuration condition of a network, a cost condition of the network, and a demand condition of the network; computing to solve an optimization problem with, at each base in the communication layer and computing layer, an objective function for minimizing a sum of a fixed cost and a variable cost at a communication link to be placed and a computer to be placed, a demand satisfaction condition that a demand for each computer is satisfied, a flow conservation condition that a traffic flow rate for a demand for each computer is conserved, and a capacity constraint that is a constraint due to a capacity of the communication link and computer at each base; and outputting a placement and a capacity of each of the communication link and computer obtained by the computing.

8 Claims, 7 Drawing Sheets

(56) References Cited

U.S. PATENT DOCUMENTS

2017/0295109 A1* 10/2017 Byers .................. H04Q 1/00
2020/0021515 A1* 1/2020 Michael ............. H04L 43/0864

OTHER PUBLICATIONS

Thomas Bauschert, Network Planning under Demand Uncertainty with Robust Optimization, 2014 (Year: 2014).*

M. Taneja and A. Davy, "Resource aware placement of IoT application modules in fog-cloud Computing Paradigm," 2017 IFIP/IEEE Symposium on Integrated Network and Service Management (IM), pp. 1222-1228, 2017.

M. Pioro and D. Medhi, "Routing, Flow and Capacity Design in Communication and Computer Networks," Morgan Kaufmann Publishers, 2004.

T. Bauschert, C. Busing, F. D'Andreagiovanni, A. C. A. Koster, M. Kutschka, and U. Steglich, "Network planning under demand uncertainty with robust optimization," IEEE Commun. Mag., vol. 52, No. 2, pp. 178-185, 2014.

K. Takeshita, H. Shiozu, M. Tsujino, and H. Hasegawa, "An Optimal Server-Allocation Method with Network Design Problem," Proc. of the 2010 IEICE Society Conf., vol. 2010, No. 2, pp. 93, 2010.

Masayuki Tsujino, "Robust Optimization Model for Designing Emerging Cloud-Fog Networks", BCD 2019—4th International Conference on Big Data, Cloud Computing, and Data Science Engineering, May 29, 2019.

* cited by examiner

Fig. 4

| BASE | DEMAND TYPE | DEMAND VARIABLES | MEAN | MAXIMUM |
|---|---|---|---|---|
| 1 | Cloud SERVIS [cl] | $d_{cl}^{(1)}$ | $\bar{d}_{cl}^{(1)}$ | $\bar{d}_{cl}^{(1)} + \tilde{d}_{cl}^{(1)}$ |
| 1 | Fog SERVIS [fg] | $d_{fg}^{(1)}$ | $\bar{d}_{fg}^{(1)}$ | $\bar{d}_{fg}^{(1)} + \tilde{d}_{fg}^{(1)}$ |
| 2 | Cloud SERVIS [cl] | $d_{cl}^{(2)}$ | $\bar{d}_{cl}^{(2)}$ | $\bar{d}_{cl}^{(2)} + \tilde{d}_{cl}^{(2)}$ |
| 2 | Fog SERVIS [fg] | $d_{fg}^{(2)}$ | $\bar{d}_{fg}^{(2)}$ | $\bar{d}_{fg}^{(2)} + \tilde{d}_{fg}^{(2)}$ |
| ... | | | | |

PARAMETER $\Gamma \geq 0$
CONSTRAINT SET DEFINING CONSTRAINT CONDITION FOLLOWED BY UNCERTAIN DEMAND $$D := \left\{ d^{(k)} \mid \bar{d}^{(k)} \leq d^{(k)} \leq \bar{d}^{(k)} + \tilde{d}^{(k)}, k \in K : \sum_{k \in K} \frac{d^{(k)} - \bar{d}^{(k)}}{\tilde{d}^{(k)}} \leq \Gamma \right\}$$

⇒ CONCEPT OF THIS UNCERTAINITY SET IS CALLED "Γ ROBUSTNESS"

Fig. 5

| Parameter | Description |
|---|---|
| $G = \{N, A\}$ | Target communication network |
| $N$ | Set of network nodes |
| $N_{gw}$ | Set of network nodes that IoT gateways are placed, $N_{gw} \subset N$ |
| $N_{cl}$ | Set of network nodes where cloud computers can be placed, $N_{cl} \subset N$ |
| $N_{fg}$ | Set of network nodes where fog computers can be placed, $N_{fg} \subset N$ |
| $A$ | Set of network links |
| $b_{lk}^{(a)}$ | Fixed design cost at link $a \in A$ |
| $c_{lk}^{(a)}$ | Traffic dependent unit cost at link $a \in A$ |
| $b_{cl}^{(n)}$ | Fixed design cost for placing clound computers at node $n \in N_{cl}$ |
| $c_{cl}^{(n)}$ | Workload dependent unit cost for assigning clound computers at node $n \in N_{cl}$ |
| $b_{fg}^{(n)}$ | Fixed design cost for placing fog computers at node $n \in N_{fg}$ |
| $c_{fg}^{(n)}$ | Workload dependent unit cost for assigning fog computers at node $n \in N_{fg}$ |
| $K_{cl}$ | Set of demands for assigning cloud computers |
| $K_{fg}$ | Set of demands for assigning fog computers |
| $K$ | Set of all demands, $K = K_{cl} \cup K_{fg}$ |
| $gw^{(k)}$ | Source node for demand $k$ |
| $N_{fg}^{(k)}$ | Set of nodes that can be assigned for each demand of fog computers $k$, $N_{fg}^{(k)} \subset N_{fg}$ |
| $h^{(k)}$ | Proportional factor of workload for demand $k \in K$ |
| $\bar{d}^{(k)}$ | Average traffic for demand $k \in K$ |
| $\tilde{d}^{(k)}$ | Maximum deviation from average traffic for demand $k \in K$ |
| $\Gamma$ | Robustness level parameter |

Fig. 6

| Variable | Description |
|---|---|
| $x_{lk}^{(a)}$ | Capacity of transmission link facilities that is installed to link $a \in A$ |
| $x_{cl}^{(n)}$ | Capacity of cloud computers that is installed to cloud node $n \in N_{cl}$ |
| $x_{fg}^{(n)}$ | Capacity of fog computers that is installed to fog node $n \in N_{fg}$ |
| $y_{lk}^{(k,a)}$ | Whether or not demand $k \in K$ is assigned to link $a \in A$ |
| $y_{cl}^{(k,n)}$ | Whether or not demand $k \in K_{cl}$ is assigned to a cloud or a fog node $n \in N_{cl} \cup N_{fg}$ |
| $y_{fg}^{(k,n)}$ | Whether or not demand $k \in K_{fg}$ is assigned to a fog node $n \in N_{fg}^{(k)}$ |
| $z_{lk}^{(a)}$ | Whether or not link $a \in A$ is placed |
| $z_{cl}^{(n)}$ | Whether or not cloud computers are installed in the cloud node $n \in N_{cl}$ |
| $z_{fg}^{(n)}$ | Whether or not fog computers are installed in the fog node $n \in N_{fg}$ |
| $d^{(k)}$ | Volume for demand $k \in K$ |

NETWORK DESIGN APPARATUS, NETWORK DESIGN METHOD AND PROGRAM

TECHNICAL FIELD

The present invention relates to a network design and, more particularly, to placement determination/capacity determination of cloud/fog computers and a communication link in a network used in an IoT infrastructure.

BACKGROUND ART

An IoT has recently become prevalent. Since the placement of a computing function in a communication network affects the traffic flow on the communication network, it is meaningful, when economically constructing an IoT infrastructure, to handle the design of a computer and a communication link as the IoT infrastructure in an integrated manner.

It has been discussed to cooperate a cloud having CPU power and a fog adjacent to the edge to take advantage of each feature to make assignment of the workload more efficient (NPL 1). A design method is necessary that looks at this fog-cloud Combined Paradigm and is conscious of a three-layer structure of a fog layer, a cloud layer, and a communication layer that can be applied thereto.

CITATION LIST

Non Patent Literature

[NPL 1] M. Taneja and A. Davy, "Resource aware placement of IoT application modules in fog-cloud Computing Paradigm," 2017 IFIP/IEEE Symposium on Integrated Network and Service Management (IM), pp. 1222-1228, 2017.
[NPL 2] M. Pioro and D. Medhi, "Routing, Flow and Capacity Design in Communication and Computer Networks," Morgan Kaufmann Publishers, 2004.
[NPL 3] T. Bauschert, C. Busing, F. D'Andreagiovanni, A. C. A. Koster, M. Kutschka, and U. Steglich, "Network planning under demand uncertainty with robust optimization," IEEE Commun. Mag., vol. 52, no. 2, pp. 178-185, 2014.
[NPL 4] K. Takeshita, H. Shiozu, M. Tsujino, and H. Hasegawa, "A n Optimal Server-Allocation Method with Network Design Problem," Proc. of the 2010 IEICE Society Conf., vol. 2010, no. 2, pp. 93, 2010.

SUMMARY OF THE INVENTION

Technical Problem

Although the network design uses a future demand, it is extremely difficult to predict the future demand of a highly innovative IoT service. So, it is necessary not to assume that a definitive value is obtained in the IoT demand prediction but add a certain degree of uncertainty of the demand in the design.

The present invention was accomplished in light of the above mentioned circumstances. A purpose of the invention is to provide a technique that allows for a capacity design and a placement design of a network including a plurality of layers, assuming uncertain demand.

Means for Solving the Problem

Provided is a network design device for designing a network, including: an input unit that is input with a configuration condition of a network that includes a communication layer and at least one computing layer, a cost condition of the network, and a demand condition representing an uncertain demand of the network are input; a computing unit that performs computation to solve an optimization problem with, at each base in the communication layer and computing layer, an objective function for minimizing a sum of a fixed cost and a variable cost at a communication link to be placed and a computer to be placed, a demand satisfaction condition that a demand for each computer is satisfied, a flow conservation condition that a traffic flow rate for a demand for each computer is conserved, and a capacity constraint that is a constraint due to a capacity of the communication link and computer at each base; and an output unit that outputs a placement and a capacity of each of the communication link and computer obtained by the computing unit.

Effects of the Invention

The disclosed technology may provide a technique that allows for a capacity design and a placement design of a network including a plurality of layers, assuming uncertain demand.

BRIEF DESCRIPTION OF DRAWINGS

FIG. 4 illustrates a demand condition.
FIG. 5 illustrates model parameters.
FIG. 6 illustrates variables.

DESCRIPTION OF EMBODIMENTS

Figure 1:
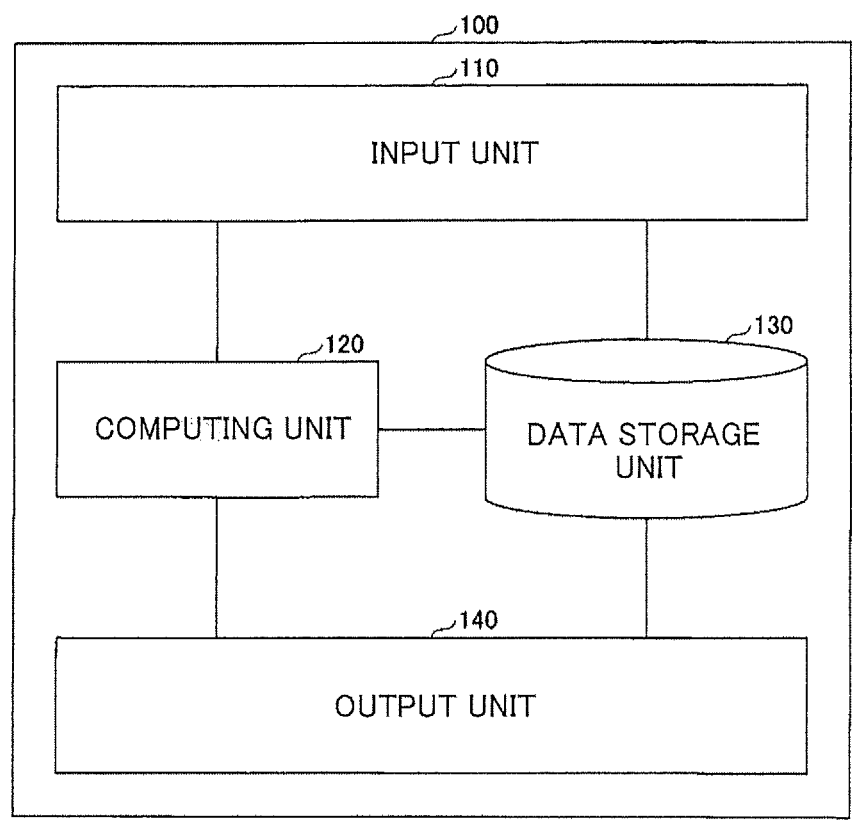
FIG. 1 is a functional configuration diagram of a network design device 100 according to an embodiment of the present invention.

Referring now to the drawings, an embodiment of the present invention will be described below. The embodiment described below is only an example, and the embodiment to which the present invention is applicable is not limited to the following embodiment.

Although the following embodiment will be described with respect to a network that includes a cloud layer, a fog layer, and a communication layer and is used as an IoT infrastructure, the present invention is not limited to such a network, but is also applicable to other networks. For example, the present invention is also applicable to a network that may be used in an application other than the IoT, the network including at least one computing layer and a communication layer.

(Example Device Configuration)

FIG. 1 is a functional configuration diagram of a network design device 100 according to the embodiment of the present invention. As shown in FIG. 1, the network design device 100 includes an input unit 110, a computing unit 120, a data storage unit 130, and an output unit 140.

The input unit 110 is input with a network configuration condition, a cost condition, and a demand condition, etc. The computing unit 120 performs calculation to solve an optimization problem. The processing details by the computing unit 120 will be described in more detail below.

The data storage unit 130 stores input data, a parameter required to solve the optimization problem, data in the middle of calculation when solving the optimization problem, and data to output, etc.

The output unit 140 outputs the placement and capacity of a computer and the placement and capacity of a link, etc. that are the results of solving the optimization problem.

The network design device 100 may be provided by, for example, allowing a computer to perform a program that describes the processing details described in this embodiment. Note that the "computer" may be a virtual machine. If the virtual machine is used, "hardware" described here may be virtual hardware. In addition, the program may be, for example, an optimization solver that is a program that describes an algorithm of the optimization problem. In other words, for example, the optimization problem in this embodiment may be solved by the optimization solver performed by a computer.

The network design device 100 may be provided by performing a program corresponding to processing performed in the network design device 100 using hardware resource such as a CPU and a memory built in a computer. The above program may be saved and distributed by recording it in a computer-readable storage medium (a portable memory, etc.). The above program may also be provided through a network such as the Internet or email.

Figure 2:
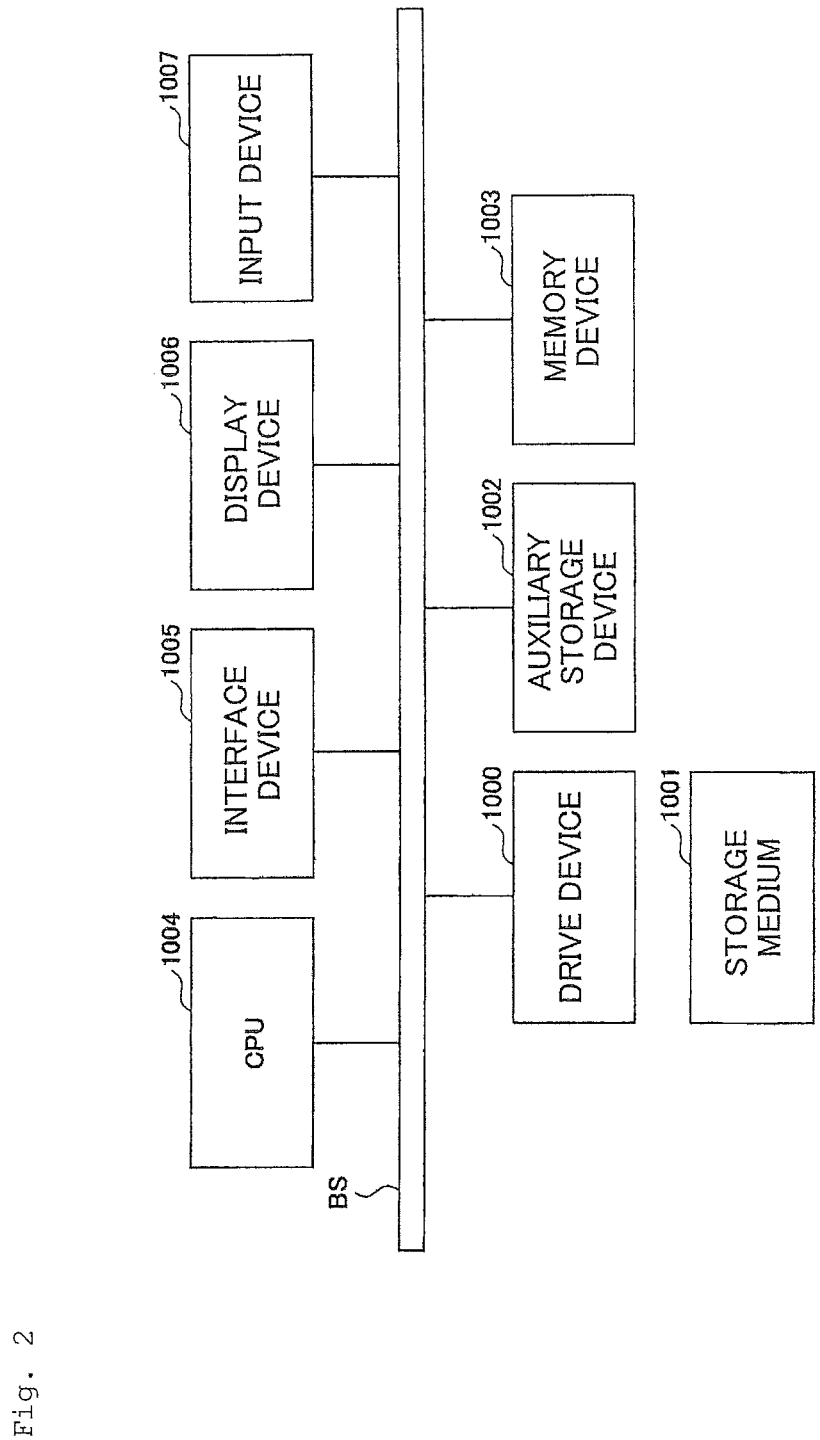
FIG. 2 illustrates an example hardware configuration of the network design device 100.

FIG. 2 illustrates an example hardware configuration of the above computer. The computer in FIG. 2 includes a drive device 1000, an auxiliary storage device 1002, a memory device 1003, a CPU 1004, an interface device 1005, a display device 1006, and an input device 1007, etc., which are interconnected by a bus B.

The program that provides processing by the computer is provided by, for example, a storage medium 1001 such as a CD-ROM or a memory card. When the storage medium 1001 storing the program is set in the drive device 1000, the program is installed from the storage medium 1001 to the auxiliary storage device 1002 through the drive device 1000. Note that the program may not necessarily be installed using the storage medium 1001 and may be downloaded from other computer via a network. The auxiliary storage device 1002 stores the installed program and stores a necessary file or data.

When the activation of the program is instructed, the memory device 1003 reads the program from the auxiliary storage device 1002 and stores it. The CPU1004 provides a function associated with the network design device 100 according to the program stored in the memory device 1003. The interface device 1005 is used as an interface for connecting to a network. The display device 1006 displays the Graphical User Interface (GUI) by the program, etc. The input device 1007 includes a keyboard, a mouse, a button, or a touch panel, etc. The input device 1007 is used to input a variety of operation instructions.

The operation of the network design device 100 (i.e., the processing details of the network design) will be described below.

(Operation Overview of Network Design Device 100) First, the network design device 100 is input with the network configuration condition, cost condition, and demand condition.

Figure 3:
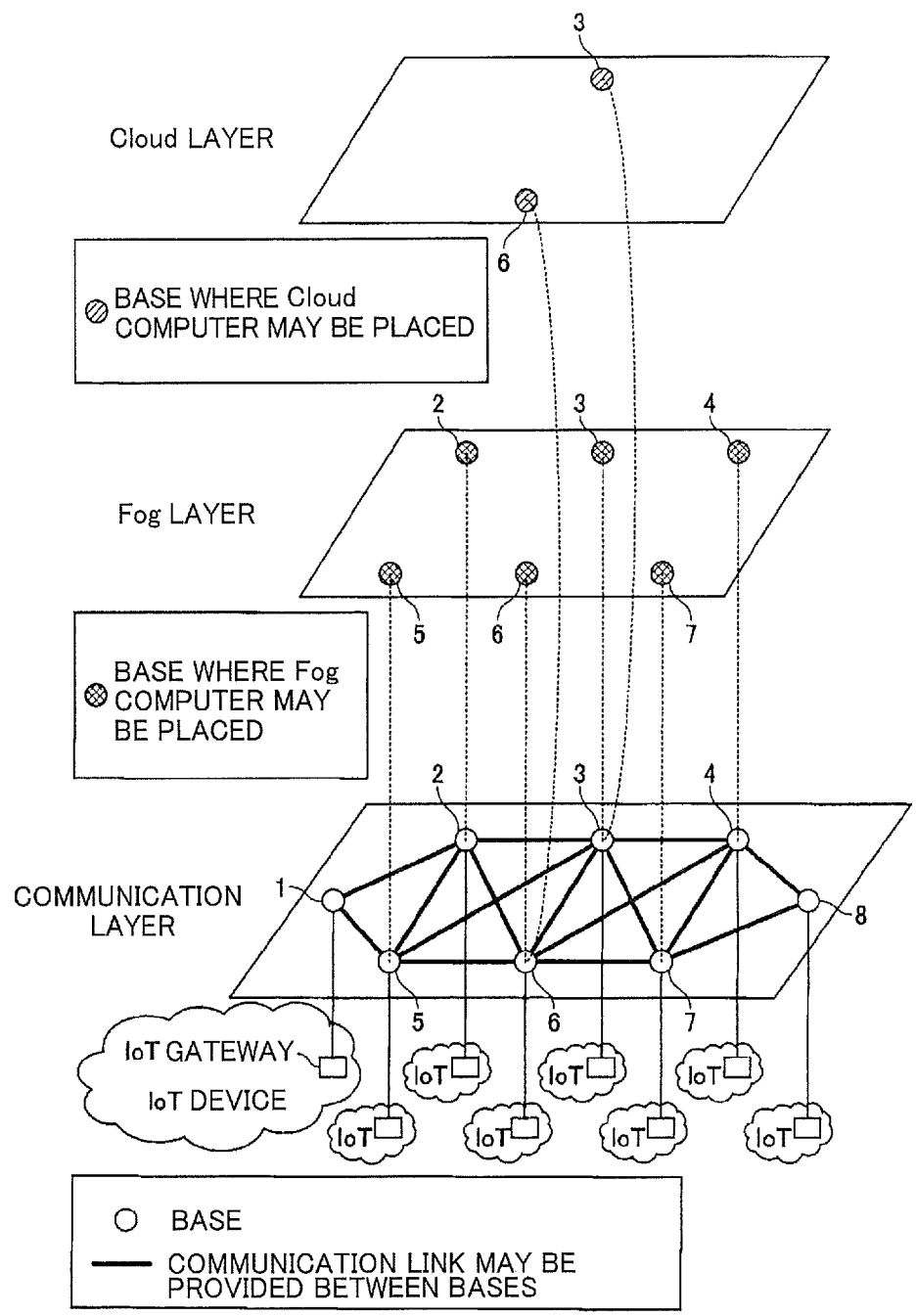
FIG. 3 illustrates an example configuration of a network to be designed.

FIG. 3 illustrates an example configuration of a network to be designed. As shown in FIG. 3, the network includes a cloud layer, a fog layer, and a communication layer. A plurality of bases (which may be called nodes) are placed in the communication layer. A communication link may be provided between the bases. In addition, an IoT gateway may be placed in the bases.

The cloud layer includes a base where a cloud computer (may be called a cloud server) may be placed. In addition, the fog layer includes a base where a fog computer (may be called a fog server) may be placed.

Data input as the network configuration condition includes information about the entire bases, information about the entire links, information about a base where the cloud computer may be placed, and information about a base where the fog computer may be placed, etc.

The cost condition includes a fixed cost of the communication link, a variable cost coefficient of the communication link per traffic, a fixed cost of the placement of the cloud/fog computers at the base, and a variable cost coefficient of the cloud/fog computers per workload, etc.

As the demand condition, the variation of demand data expected as uncertainty is set. FIG. 4 illustrates an example demand condition. As shown in FIG. 4, the demand condition is provided as set D representing uncertain demand. As described in FIG. 4, the concept of this uncertainty set is called "Γ robustness".

In FIG. 4, the table shows the uncertain demand assigned to the cloud computer and the uncertain demand assigned to the fog computer for each base. The set D defines the constraint of the uncertain demand.

On the assumption that the worst situation occurs in the demand variation provided in the demand condition, the computing unit 120 of the network design device 100 determines and outputs the placement and capacity of the cloud/fog computers and the placement and capacity of the communication link as the IoT infrastructure design by the cloud-fog cooperation that may be constructed at the minimum cost.

In other words, the computing unit 120 of the network design device 100 determines the placement and capacity of a facility that may satisfy any combination pattern of demands in the range of the demand variation provided in the demand condition and may be constructed at as low cost as possible under the cost condition.

Before describing the processing details by the computing unit 120 in more detail, a related conventional technology will be described as a reference. With respect to the communication link, a problem of a network design under the determined demand condition is described as "Topological Design" in NPL 2.

In addition, for a problem of a communication-only network design, a design method has been discussed that determines the placement of the communication link using the approach of the robust optimization assuming uncertain demand (the capacity design is not applicable) (NPL 3). In addition, with respect to the determined demand, a heuristic solution is provided for a problem of a network design by cooperation of a content server and a communication link (NPL 4).

The network setting device 100 according to this embodiment performs a capacity design and a placement design by cooperation of a plurality of layers (three layers of cloud/fog/communication), assuming uncertain demand, without an example of discussion and analysis by the conventional technologies.

(Detailed Operation of Network Design Device 100) As described above, the computing unit 120 of the network design device 100 determines the placement and capacity of the cloud/fog computers and the placement and capacity of the communication link by solving the optimization problem. The formulation of the optimization problem and the point of the solution are as follows. They are described below as means 1, means 2, and means 3, sequentially.

(Means 1) The variation of demand data expected as uncertainty is set, and as the placement and capacity determination of an IoT infrastructure at the minimum cost that may satisfy any demand pattern occurring in this variation, the formulation is performed according to the robust optimization approach (reference: A. Ben-tal and A. Nemirovski, "Robust solutions of Linear Programming problems contaminated with uncertain data," Math. Program., vol. 88, pp. 411-424, 2000) to determine.

(Means 2) As it is, the formulation under the Γ robustness (Means 1) is not the normal optimization problem format. Therefore, the normal-format optimization problem (Robust Counterpart) equivalent to this is solved. This normal-format optimization problem (linear mixed integer programming problem) may be solved using the optimization solver. The computing unit 120 of the network design device 100 performs computation to solve this normal-format optimization problem. Note that the present invention is not limited to solving the optimization problem of the Robust Counterpart in the means 1, but may be applied to any method for solving the optimization problem formulated in the means 1.

(Means 3) In order to improve the solution speed of the linear mixed integer programming problem in the (Means 2), the computing unit 120 of the network design device 100 solves the optimization problem by applying the heuristic approach according to the greedy algorithm, if a single demand is not splittable. If a single demand is splittable, the computing unit 120 of the network design device 100 solves the optimization problem by applying the heuristic approach according to the greedy algorithm or capacity scaling method. Note that in the present invention, the application of the means 3 is not required, and the means 3 may not be applied or a solution method other than the means 3 may be applied.

(Specific Processing Details)

More specific processing details according to the above means 1 to 3 are as follows.

This embodiment provides, at each base in the communication layer, fog layer, and cloud layer, an objective function for minimizing the sum of the fixed cost and the variable cost at the communication link to be placed and the computer to be placed. In addition, a demand satisfaction condition is that a demand for each computer is satisfied. In addition, a flow conservation condition is that a traffic flow rate for a demand for each computer is conserved. In addition, a capacity constraint is a constraint due to a capacity of a link and a computer at each base.

The computing unit 120 of the network design device 100 determines the placement and capacity of the communication link at the minimum cost, fog server, and cloud server that may ensure assignment even for uncertain variation of the demand (defined by the Γ robustness) from each base to the server by solving an optimization problem having the above objective function and conditions/constraint.

Note that the optimization problem solved by the computing unit 120 of the network design device 100 is the normal-format optimization problem that is Robust Counterpart derived from the formulation in the means 1.

The solution method itself of the optimization problem is not limited to a specific solution method, and the computing unit 120 of the network design device 100 may solve the optimization problem using, for example, the following methods of option 1 and option 2.

<Option 1>

In Robust Counterpart in (means 2), the cloud/fog computers and communication link are first placed at all candidate locations and the placement is fixed, and the candidate location is removed where the update of the minimum value of Robust Counterpart is maximum. The optimization problem is solved using an approach based on the greedy algorithm that repeats the above procedure until the updated value is at a specified value or less (reference: Naoto Katayama, "*Nettowaku Sekkei Mondai* (Network Design Problem)", Asakura Publishing Co., Ltd., 2008).

The technique of Option 1 performs locations not to be placed in the order of evaluation according to independent evaluation. It is thus expected to speed up the calculation time.

<Option 2>

If a single demand is splittable, in Robust Counterpart in (means 2), the placement of the cloud/fog computers and communication link are first placed at all candidate locations and solved as the linear relaxation problem (fast solution is possible) that relaxes to a positive real number a control variable related to the presence or absence of the placement that must be usually handled as a binary variable. In addition, the linear relaxation problem is solved again by updating the capacity using an approach based on the capacity scaling method (reference: N. Katayama, "A Capacity Scaling Heuristic for the Multicommodity Capacitated Network Design Problem," Journal of Computational and Applied Mathematics, vol. 232, no. 1, pp. 90-101, 2009). This is repeated until a stopping condition is satisfied to obtain a problem in which the location whose capacity is close to zero is deleted from the placement candidates. This small problem may be solved to speed up the calculation time.

The technique of Option 2 needs to be repeated until the stopping condition is satisfied. But it allows solution of a linear programming problem that provides overwhelmingly faster calculation than the original mixed-integer programming problem (by Robust Counterpart). Thus, the calculation time may be speeded up.

EXAMPLES

As an example, the formulation of the optimization problem will be described in more detail below. First, the formulation of the means 1 (the robust optimization model) will be described.

FIG. 5 shows model parameters used in the formulation of the means 1. FIG. 6 shows variables used in the formulation of the means 1.

In FIG. 5, G={N, A} represents a network to be designed. N represents a set of network nodes (bases). $N_{gw}$ represents a network node in the N where the IoT gateway is placed. $N_{cl}$ represents a network node in the N where the cloud computer may be placed. $N_{fg}$ represents a network node in the N where a fog computer may be placed.

A represents a set of communication links. $b_{lk}^{(a)}$ represents a fixed cost at link a. $c_{lk}^{(a)}$ represents a traffic-dependent unit cost at the link a. $b_{cl}^{(n)}$ represents a fixed cost for placing a cloud computer at node n. $c_{cl}^{(n)}$ represents a work load-dependent unit cost for assigning a cloud computer at node n. $b_{fg}^{(n)}$ represents a fixed cost for placing a fog computer at node n. $c_{fg}^{(n)}$ represents a work load-dependent unit cost for assigning a cloud computer at node n.

$K_{cl}$ represents a set of demands for assigning the cloud computer. $K_{fg}$ represents a set of demands for assigning the fog computer. K represents all demands. $gw^{(k)}$ represents the source node for the demand k.

$N_{fg}^{(k)}$ represents a set of nodes that may be assigned for each demand k of the fog computer. h(k) represents a proportion factor of the work load for demand k. $d^{(k)}$ with an overbar represents an average traffic for the demand k. $d^{(k)}$ with a tilde represents the maximum variation from the average traffic for the demand k. Γ represents a robustness level parameter.

In FIG. 6, $x_{lk}^{(a)}$ represents the capacity of a communication link facility placed at the link a. $x_{cl}^{(n)}$ represents the capacity of a cloud computer placed at the node n. $x_{fg}^{(n)}$ represents the capacity of a fog computer placed at the node n.

$y_{lk}^{(k,a)}$ represents whether or not the demand k is assigned to the link a. $y_{cl}^{(k,n)}$ represents whether or not the demand k is assigned to a cloud node n or a fog node n. $y_{fg}^{(k,n)}$ represents whether or not the demand k is assigned to the fog node n.

$z_{lk}^{(a)}$ represents whether or not the link a is placed. $z_{cl}^{(n)}$ represents whether or not the cloud computer is placed at the cloud node n. $z_{fg}^{(n)}$ represents whether not the fog computer is placed at the fog node n. d(k) represents the volume (capacity) of the demand k.

<Uncertain Demand>
The uncertain demand is represented by the following formula.

[Formula 1]

$$D := \left\{ d^{(k)} \,\bigg|\, \overline{d}^{(k)} \leq d^{(k)} \leq \overline{d}^{(k)} + \tilde{d}^{(k)},\, k \in K;\, \sum_{k \in K} \frac{d^{(k)} - \overline{d}^{(k)}}{\tilde{d}^{(k)}} \leq \Gamma \right\} \quad (1)$$

Note that in these variables, such vector notation is permitted as $x = \{x_{lk}^{(a)}, x_{cl}^{(n\_cl)}, x_{fg}^{(n\_fg)} \mid a$ belonging to A, $n_{cl}$ belonging to $N_{cl}$, $n_{fg}$ belonging to $N_{fg}\}$.

<Objective Function>
Because the cost is a sum of the fixed cost and variable cost depending on the capacity of the communication link to be placed, the capacity of the cloud computer, and the capacity of the fog computer, the objective function is as follows.

[Formula 2]

$$F(x,z) = b \cdot z + c \cdot x = \sum_{a \in A} b_{lk}^{(a)} \cdot z_{lk}^{(a)} + \sum_{a \in A} c_{lk}^{(a)} \cdot x_{lk}^{(a)} + \quad (2)$$

$$\sum_{n \in N_{cl}} b_{cl}^{(n)} \cdot z_{cl}^{(n)} + \sum_{n \in N_{cl}} c_{cl}^{(n)} \cdot x_{cl}^{(n)} + \sum_{n \in N_{fg}} b_{fg}^{(n)} \cdot z_{fg}^{(n)} + \sum_{n \in N_{fg}} c_{fg}^{(n)} \cdot x_{fg}^{(n)}$$

<Demand Satisfaction Condition>
The demand satisfaction condition represents that each cloud/fog demand is assigned to a computer at any of the assignable bases (nodes) and is represented by the following formula.

[Formula 3]

$$\sum_{n \in N_{cl}} y_{cl}^{(k,n)} + \sum_{n \in N_{fg}} y_{fg}^{(k,n)} = 1, \text{ for } k \in K_{cl} \quad (3a)$$

$$\sum_{n \in N_{fg}^{(k)}} y_{fg}^{(k,n)} = 1, \text{ for } k \in K_{fg} \quad (3b)$$

Note that the left side second term in formula (3a) is based on the assumption that the fog computer may be assigned for the cloud demand.

<Flow Conservation Law>
The following formulas represent relational expressions that represent the conservation of the traffic flow rate for the demand for a cloud/fog server on the communication network.

[Formula 4]

$$\sum_{a \in out(n)} y_{lk}^{(k,a)} - \sum_{a \in in(n)} y_{lk}^{(k,a)} = \begin{cases} -y_{cl}^{(k,n)} & \text{if } n \in N_{cl} \quad (4a) \\ -y_{fg}^{(k,n)} & \text{if } n \in N_{fg} \quad (4b) \\ 1 & \text{if } n = gw^{(k)} \quad (4c) \\ 0 & \text{otherwise,} \quad (4d) \end{cases}$$

for $n \in N, k \in K_{cl}$

[Formula 5]

$$\sum_{a \in out(n)} y_{lk}^{(k,a)} - \sum_{a \in in(n)} y_{lk}^{(k,a)} = \begin{cases} -y_{fg}^{(k,n)} & \text{if } n \in N_{fg}^{(k)} \quad (5a) \\ 1 & \text{if } n = gw^{(k)} \quad (5b) \\ 0 & \text{otherwise,} \quad (5c) \end{cases}$$

for $n \in N, k \in K_{fg}$

Note that in the above formulas, in(n)/out(n) for n belonging to N represent a set of links entering/exiting from the node n at n.

Note that the formula (4b) is based on the assumption that the demand for the cloud server may be satisfied by assigning the fog server.

<Capacity Constraint>
The traffics flowing through the communication links and the servers assignable at the cloud and fog bases are limited by the capacity of the links and bases. The limitation is represented by the following formula.

[Formula 6]

$$\sum_{k \in K} d^{(k)} \cdot y_{lk}^{(k,a)} \leq x_{lk}^{(a)}, \text{ for } a \in A \quad (6a)$$

$$\sum_{k \in K_{cl}} h^{(k)} \cdot d^{(k)} \cdot y_{cl}^{(k,n)} \leq x_{cl}^{(n)}, \text{ for } n \in N_{cl} \quad (6b)$$

$$\sum_{k \in K} h^{(k)} \cdot d^{(k)} \cdot y_{fg}^{(k,n)} \leq x_{fg}^{(n)}, \text{ for } n \in N_{fg} \quad (6c)$$

<Placement Constraint>
The placement constraint represents the condition that a facility needs to be placed if any traffic or workload is assigned to the communication link or cloud/fog node. The placement constraint is represented by the following constraint formulas.

[Formula 7]

$$x_{lk}^{(a)} \leq M \cdot z_{lk}^{(a)}, \text{ for } a \in A \quad (7a)$$

$$x_{cl}^{(n)} \leq M \cdot z_{cl}^{(n)}, \text{ for } n \in N_{cl} \quad (7b)$$

$$x_{fg}^{(n)} \leq M \cdot z_{fg}^{(n)}, \text{ for } n \in N_{fg} \quad (7c)$$

(7d)

The above constraint formulas are based on the big-M method. The parameter M has to be a large enough value so that the constraint formulas always hold when z=1.

<Control Variable Definition>

The following constraint is provided from the control variable definition.

[Formula 8]

$$x \leq 0,\ y,\ z \in \{0, 1\} \tag{8}$$

Here, with respect to x, y, and z, S represents a constraint set derived from d-independent constraint conditions (3)-(5), (7), and (8) and T(d) represents a constraint set derived from a d-dependent constraint condition (6).

Thus, the robust design problem of the IoT infrastructure may be modeled by the following robust optimization problem that determines the minimum cost ensured for any demand pattern of the uncertain demand set D.

[Formula 9]

$$\min : F(x, z) \tag{9}$$

[Formula 10]

$$\text{s.t.} : \{x, y, z\} \in S \cap T(d),\ \forall d \in D \tag{10}$$

The derivation process of the Robust Counterpart will now be described.

First, consider a demand that maximizes the objective function. From the constraints (6a) and (1), the capacity of the communication link a that increases the objective function may be considered using the following problem $P_{lk}^{(a)}$ and a belonging to A.

[Formula 11]

$$\max : \sum_{k \in K} \tilde{d}^{(k)} \cdot y_{lk}^{(k,a)} \cdot w^k \tag{11}$$

[Formula 12]

$$\text{s.t.} : \sum_{k \in K} w^{(k)} \leq \Gamma\left[\pi_{lk}^{(a)}\right] \tag{12}$$

[Formula 13]

$$w^{(k)} \leq 1,\ \text{for}\ k \in K\left[\rho_{lk}^{(k,a)}\right] \tag{13}$$

[Formula 14]

$$w^{(k)} \geq 0,\ \text{for}\ k \in K \tag{14}$$

Note that here the following variable transformation is made to simplify the model handling.

[Formula 15]

$$w^{(k)} \rightarrow \frac{d^{(k)} - \tilde{d}^{(k)}}{\tilde{d}(k)} \tag{15}$$

With the dual variables for the constraint conditions (12) and (13) in the above formulas being $\pi^{(a)}$ and $\rho^{(k,\ a)}$, the following dual problem $Q_{lk}^{(a)}$ and a belonging to A may be configured.

[Formula 16]

$$\min : \Gamma \cdot \pi_{lk}^{(a)} + \sum_{k \in K} \rho_{lk}^{(k,a)} \tag{16}$$

[Formula 17]

$$\text{s.t.} : \pi_{lk}^{(a)} + \rho_{lk}^{(k,a)} \geq \tilde{d}^{(k)} \cdot y_{lk}^{(k,a)},\ \text{for}\ k \in K \tag{17}$$

[Formula 18]

$$\pi_{lk}^{(a)} \geq 0 \tag{18}$$

[Formula 19]

$$\rho_{lk}^{(k,a)} \geq 0,\ \text{for}\ k \in K \tag{19}$$

A dual problem may also be configured for the cloud node n belonging to $N_{cl}$ and the fog node n belonging to $N_{fg}$. Thus, the following Robust Counterpart optimization problem equivalent to the robust optimization model may be derived.

[Formula 20]

$$\min: b \cdot z + \sum_{a \in A} c_{lk}^{(a)} \cdot \left\{ \sum_{k \in K} \tilde{d}^{(k)} \cdot y_{lk}^{(k,a)} + \Gamma \cdot \pi_{lk}^{(a)} + \sum_{k \in K} p_{lk}^{(k,a)} \right\} + \\ \sum_{n \in N_{cl}} c_{cl}^{(n)} \cdot \left\{ \sum_{k \in K_{cl}} \tilde{d}^{(k)} \cdot y_{cl}^{(k,n)} + \Gamma \cdot \pi_{cl}^{(n)} + \sum_{k \in K_{cl}} \rho_{cl}^{(k,n)} \right\} + \\ \sum_{n \in N_{fg}} c_{fg}^{(n)} \cdot \left\{ \sum_{k \in K} \tilde{d}^{(k)} \cdot y_{fg}^{(k,n)} + \Gamma \cdot \pi_{fg}^{(n)} + \sum_{k \in K} \rho_{fg}^{(k,n)} \right\} \tag{20}$$

$$\text{s.t.}: \{x, y, z\} \in S$$

[Formula 21]

$$\pi_{lk}^{(a)} + p_{lk}^{(k,a)} \geq \tilde{d}^{(k)} \cdot y_{lk}^{(k,a)},\ \text{for}\ k \in K \tag{21}$$

[Formula 22]

$$\pi_{cl}^{(n)} + \rho_{cl}^{(k,n)} \geq h^{(k)} \cdot \tilde{d}^{(k)} \cdot y_{cl}^{(k,n)},\ \text{for}\ k \in K_{cl} \tag{22}$$

[Formula 23]

$$\pi_{fg}^{(n)} + p_{fg}^{(k,n)} \geq h^{(k)} \cdot \tilde{d}^{(k)} \cdot y_{fg}^{(k,n)},\ \text{for}\ k \in K \tag{23}$$

[Formula 24]

$$\pi, \rho \geq 0 \tag{24}$$

(Example of Evaluation)

For a network with various number of nodes (the number of links is four times the number of nodes), a robust design with different Γ is performed. In addition, while maintaining the capacity ratio, the capacity of designs of Γ=1 to 4 are corrected so that the cost condition is the same as in Γ=5, and the corrected network is subjected to a simulation to see whether a demand generated by random numbers generates over capacity. In other words, in all simulations, all demand is generated at the same condition and the demand is generated by random numbers.

Figure 7:
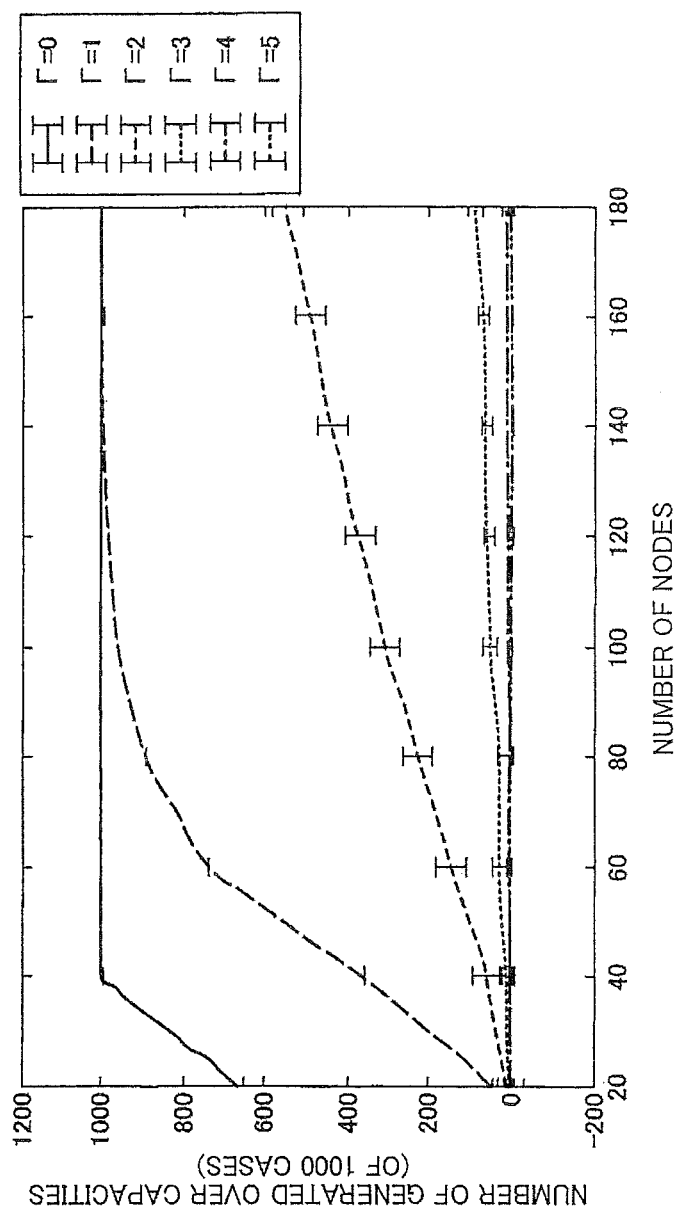
FIG. 7 illustrates an evaluation example.

In the above simulation, the demand is determined to be unsatisfied (capacity lack) if even one location is not satisfied. FIG. 7 shows the number of demand unsatisfied (capacity lack) cases of 1000 cases that is plotted in the y-axis. The x-axis shows the number of nodes of the network to be designed.

Γ is the parameter for placement and capacity determination included in the model. The larger Γ provides a higher cost design solution. As it is obvious that the capacity lack does not occur for a high cost (=a large capacity), the cost is adjusted to all Γ by changing the capacity while keeping a constant ratio.

FIG. 7 shows that in a simulation with the same facility cost, the ratio of the over-capacity decreases as the value of Γ increases. It is thus considered that a network obtained by the robust design for various network conditions may provide robust accommodation for the demand variation.

In other words, even for the same cost, the larger Γ (=more robust design and interpretation) may provide less over-capacity and thus provide a robust design efficiently.

(Effects of Embodiment)

The technology according to the above described embodiment may determine the placement and capacity of a facility that may satisfy any combination pattern of demands generated in the range of the demand variation defined by the T robustness and may be constructed at the minimum cost.

In addition, although the optimum combination of setting change time is not provided, the desired placement and capacity may be provided in a relatively short calculation time.

(Summary of Embodiment)

This embodiment may provide at least a network design device, a network design method, and a program described in the following clauses.

(First Clause)

A network design device for designing a network, including: an input unit that is input with a configuration condition of a network that includes a communication layer and at least one computing layer, a cost condition of the network, and a demand condition representing an uncertain demand of the network are input; a computing unit that performs computation to solve an optimization problem with, at each base in the communication layer and computing layer, an objective function for minimizing a sum of a fixed cost and a variable cost at a communication link to be placed and a computer to be placed, a demand satisfaction condition that a demand for each computer is satisfied, a flow conservation condition that a traffic flow rate for a demand for each computer is conserved, and a capacity constraint that is a constraint due to a capacity of the communication link and computer at each base; and an output unit that outputs a placement and a capacity of each of the communication link and computer obtained by the computing unit.

(Second Clause)

The network design device of the first clause, wherein the computing unit solves a linear mixed integer programming problem that is an optimization problem of a robust counterpart derived as a dual problem from an optimization problem formulated by a robust optimization approach.

(Third Clause)

The network design device of the second clause, wherein the computing unit solves the linear mixed integer programming problem using a greedy algorithm.

(Fourth Clause)

The network design device of the second or third clause, wherein the computing unit solves the linear mixed integer programming problem using a capacity scaling method if a single demand is splittable.

(Fifth Clause)

The network design device of any one of the first to fourth clauses, wherein the at least one computing layer includes a cloud layer and fog layer.

(Six Clause)

A network design method performed by a network design device for designing a network, including: the input step of inputting a configuration condition of a network that includes a communication layer and at least one computing layer, a cost condition of the network, and a demand condition representing an uncertain demand of the network; the computing step of performing computation to solve an optimization problem with, at each base in the communication layer and computing layer, an objective function for minimizing a sum of a fixed cost and a variable cost at a communication link to be placed and a computer to be placed, a demand satisfaction condition that a demand for each computer is satisfied, a flow conservation condition that a traffic flow rate for a demand for each computer is conserved, and a capacity constraint that is a constraint due to a capacity of the communication link and computer at each base; and an output step of outputting a placement and a capacity of each of the communication link and computer obtained by the computing unit.

(Seventh Clause)

A program for allowing a computer to function as each unit in the network design device according to any one of the first to fifth clauses.

Thus, while this embodiment has been described in detail, the present invention is not limited to the above specific embodiment and various changes and modifications may be made as they are within the spirit and scope of the invention described in the claims.

REFERENCE SIGNS LIST

100 Network design device
110 Input unit
120 Computing unit
130 Data storage unit
140 Output unit
1000 Drive device
1001 Storage medium
1002 Auxiliary storage device
1003 Memory device
1004 CPU
1005 Interface device
1006 Display device
1007 Input device

The invention claimed is:

1. A network design device for designing a network, the network design device comprising:
a processor; and
a memory that includes instructions, which when executed, cause the processor to execute the following steps:
inputting a configuration condition of a network that includes a communication layer, a cloud layer and a fog layer, a cost condition of the network, and a demand condition representing an uncertain demand of the network;
computing to solve an optimization problem with, at each base in the communication layer, the cloud layer and the fog layer, an objective function for minimizing a sum of a fixed cost and a variable cost at a communication link to be placed and a computer to be placed in the communication layer, the cloud layer and the fog layer, a demand satisfaction condition that a demand for each computer is satisfied in the cloud layer and the fog layer based on an assumption that the fog layer is able to be assigned to the demand for the cloud layer, a flow conservation condition that a traffic flow rate for the demand for each computer is conserved in the cloud layer and the fog layer, and a capacity constraint that is a constraint due to a capacity of the communication link and computer at each base;

outputting a placement and a capacity of each of the communication link and computer obtained by the computing; and performing a capacity design of the communication layer, the cloud layer and the fog layer by setting an expected variation of demand data as the uncertain demand, the expected variation being provided as an uncertain demand set including an uncertain demand assigned to the cloud layer and an uncertain demand assigned to the fog layer at each base, wherein the capacity design is determined to satisfy all combination patterns of demands generated in a range of the expected variation at a minimum cost.

2. The network design device according to claim 1, wherein the computing solves a linear mixed integer programming problem that is an optimization problem of a robust counterpart derived as a dual problem from an optimization problem formulated by a robust optimization approach.

3. The network design device according to claim 2, wherein the computing solves the linear mixed integer programming problem using a greedy algorithm.

4. The network design device according to claim 2, wherein the computing solves the linear mixed integer programming problem using a capacity scaling method in a case where a single demand is splittable.

5. A network design method performed by a network design device for designing a network, the method comprising:

inputting a configuration condition of a network that includes a communication layer, a cloud layer and a fog layer, a cost condition of the network, and a demand condition representing an uncertain demand of the network;

computing to solve an optimization problem with, at each base in the communication layer, the cloud layer and the fog layer, an objective function for minimizing a sum of a fixed cost and a variable cost at a communication link to be placed in the communication layer, the cloud layer and the fog layer and a computer to be placed, a demand satisfaction condition that a demand for each computer is satisfied in the cloud layer and the fog layer based on an assumption that the fog layer is able to be assigned to the demand for the cloud layer, a flow conservation condition that a traffic flow rate for the demand for each computer is conserved in the cloud layer and the fog layer, and a capacity constraint that is a constraint due to a capacity of the communication link and computer at each base;

outputting a placement and a capacity of each of the communication link and computer obtained by the computing; and performing a capacity design of the communication layer, the cloud layer and the fog layer by setting an expected variation of demand data as the uncertain demand, the expected variation being provided as an uncertain demand set including an uncertain demand assigned to the cloud layer and an uncertain demand assigned to the fog layer at each base, wherein the capacity design is determined to satisfy all combination patterns of demands generated in a range of the expected variation at a minimum cost.

6. A non-transitory storage medium for storing a program for causing a computer to execute the network design method according to claim 5.

7. The network design device according to claim 1, wherein the variation of demand data as the uncertain demand is expected by using a mean value and a maximum value of a demand at each base.

8. A network design device for designing a network, the network design device comprising:

a processor; and a memory that includes instructions, which when executed, cause the processor to execute the following steps:

inputting a configuration condition of a network that includes a communication layer, a cloud layer and a fog layer, a cost condition of the network, and a demand condition representing an uncertain demand of the network;

computing to solve an optimization problem with, at each base in the communication layer, the cloud layer and the fog layer, an objective function for minimizing a sum of a fixed cost and a variable cost at a communication link to be placed and a computer to be placed, a demand satisfaction condition that a demand for each computer is satisfied, a flow conservation condition that a traffic flow rate for the demand for each computer is conserved, and a capacity constraint that is a constraint due to a capacity of the communication link and computer at each base;

outputting a placement and a capacity of each of the communication link and computer obtained by the computing; and performing a capacity design of the communication layer, the cloud layer and the fog layer by setting an expected variation of demand data as the uncertain demand, the expected variation being provided as an uncertain demand set D represented by formula (1)

$$D := \left\{ d^{(k)} \mid \bar{d}^{(k)} \leq d^{(k)} \leq \bar{d}^{(k)} + \tilde{d}^{(k)}, k \in K; \sum_{k \in K} \frac{d^{(k)} - \bar{d}^{(k)}}{\tilde{d}^{(k)}} \leq \Gamma \right\} \quad (1)$$

where d(k) represents a demand k, d(k) with an overbar represents an average traffic for the demand k, d(k) with a tilde represents a maximum variation from the average traffic for the demand k, and F represents a robustness level parameter, the uncertain demand set D including an uncertain demand assigned to the cloud layer and an uncertain demand assigned to the fog layer at each base, wherein the capacity design is determined to satisfy all combination patterns of demands generated in a range of the expected variation at a minimum cost.

* * * * *